United States Patent [19]

Perry

[11] Patent Number: 5,116,001

[45] Date of Patent: May 26, 1992

[54] VARIABLE AIR INTAKE

[75] Inventor: Alan F. E. Perry, Filton, England

[73] Assignee: British Aerospace Public Limited Company, London, England

[21] Appl. No.: 548,706

[22] Filed: Jul. 6, 1990

[30] Foreign Application Priority Data

Jul. 6, 1989 [GB] United Kingdom ............ 8915481

[51] Int. Cl.[5] .............................................. B64D 33/02
[52] U.S. Cl. ................................. 244/53 B; 137/15.1
[58] Field of Search ..................... 244/53 B; 137/15.1, 137/15.2

[56] References Cited

U.S. PATENT DOCUMENTS 2,744,382  5/1956  Sokol et al. ...................... 244/53 B
3,319,402  5/1967  Ritchie ............................. 244/53 B
4,372,505  2/1983  Syberg ............................. 244/53 B
4,760,978  8/1988  Schuyler et al. ................. 244/53 B
4,782,659  11/1988  Lewis et al. ..................... 137/15.1
5,000,399  3/1991  Readnour et al. ............... 244/53 B

FOREIGN PATENT DOCUMENTS 0358347  3/1990  European Pat. Off. .
0358348  3/1990  European Pat. Off. .
1190812  5/1970  United Kingdom .

Primary Examiner—Joseph F. Peters, Jr.
Assistant Examiner—Virna Lissi Mojica
Attorney, Agent, or Firm—Cushman, Darby & Cushman

[57] ABSTRACT

A variable air intake includes a movable ramp (2) driven by a carriage (6) that moves linearly on a drive screw (7). To protect the drive screw (7) from hot gases a thermal blind (13) is provided that moves with the carriage (6). The blind (13) is guided and supported by guide means (15, 18, 19) formed integrally with a structural unit (17) housing the drive screw (7), and is tensioned by tensioning means (16, 19).

14 Claims, 4 Drawing Sheets

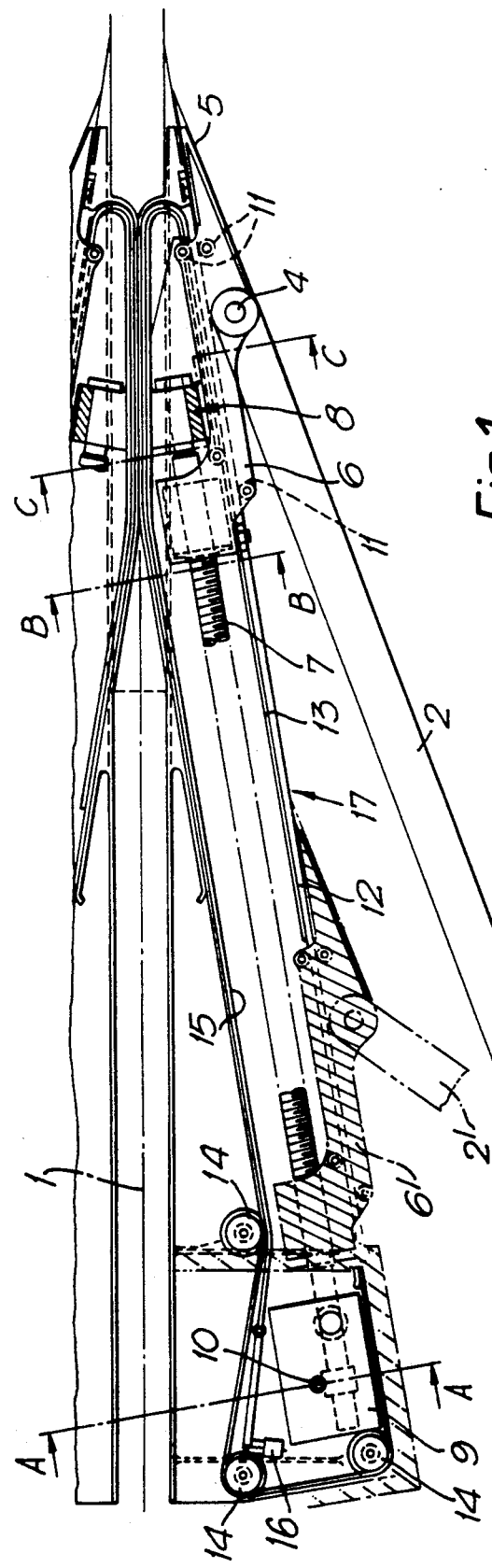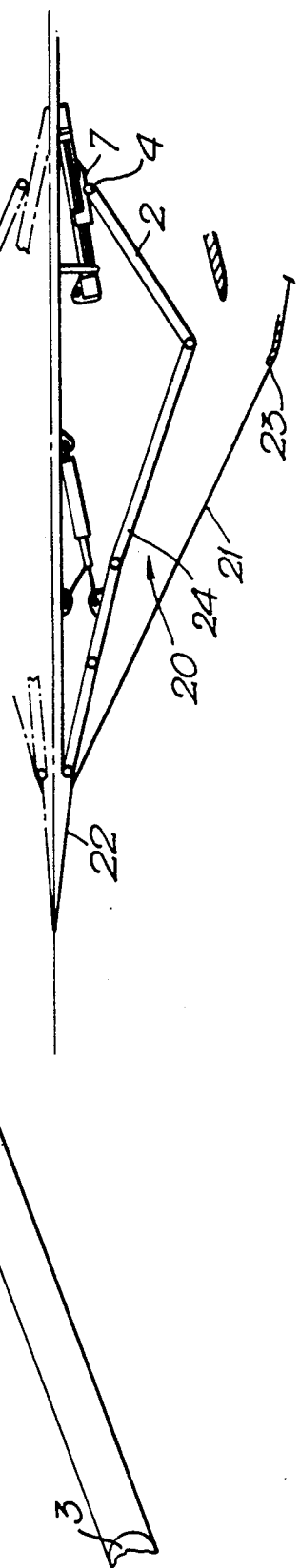

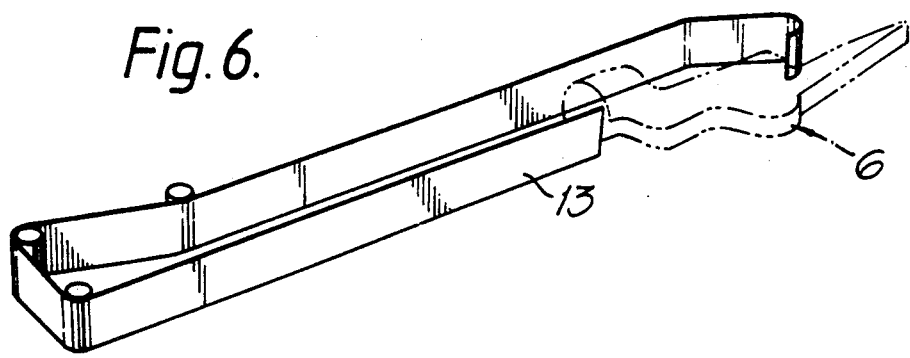
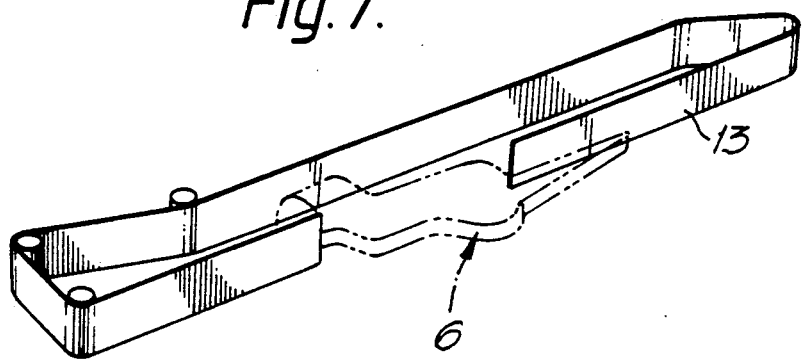
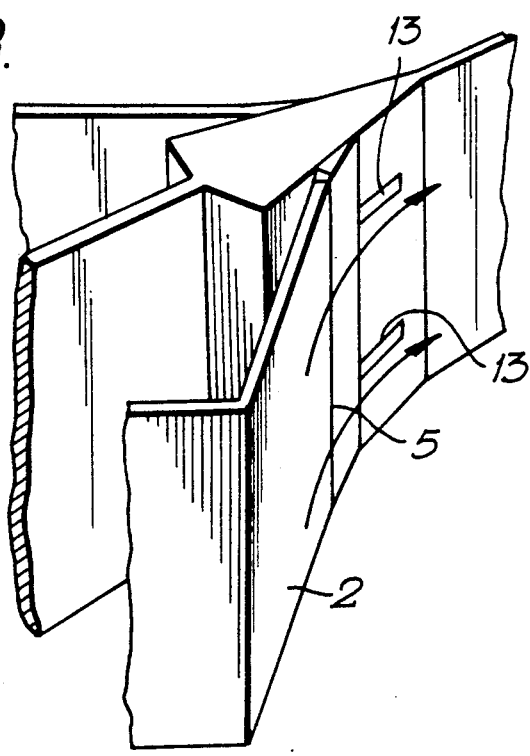

VARIABLE AIR INTAKE

This invention relates to a variable air intake for an aircraft or the like, and in particular to such an intake comprising a number of ramp members that may be moved to vary the geometry of the intake.

In order to optimise air intake efficiency over a range of speeds, it is known to provide intakes of variable geometry, different intake configurations being more suited for different speeds. One known way of achieving this is to provide the intake with a number of pivotally interconnected ramps that may be moved, for example by means of a drive screw, to vary the inner dimensions of the intake. The intake structure, including the ramp members, may be made from non-metallic materials to protect the intake from high temperatures. Drive screws, however, must still be made of steel or titanium, and in certain ramp positions portions of such drive screws may be exposed disadvantageously to high temperature intake air. It would be beneficial to protect such drive screws or other types of drive means from damage caused by the impingement of hot air. In addition, exposed drive screws can also cause unwanted turbulence by spoiling the smooth flow of air in the intake.

According to the present invention there is provided a variable air intake comprising a ramp member movable by drive means to alter the configuration of said intake, said intake further comprising a thermal shield member movable with said ramp member to shield a portion of the drive means that would otherwise be exposed by movement of the ramp member.

In a particularly preferred embodiment the ramp member is fixed at one end to a carriage mounted for linear movement on a drive screw, and said shield member comprises a substantially continuous thermal blind fixed to and movable with said carriage to shield said drive screw.

Preferably the blind is fixed to both ends of the carriage and is guided by guide means, including blind tensioning means, so as to move with the carriage. The guide means may be formed integrally with the intake structure. The blind tensioning means may comprise, for example a tensioning pulley or roller.

In a particularly preferred embodiment the ramp member may be driven by two carriages mounted on separate drive screws with a fairing member spanning said carriages to the rear of the ramp member, and each carriage and each drive screw being provided with a separate shield member.

An embodiment of the invention will now be described by way of example and with reference to the accompanying drawings, in which:

FIG. 1 is a diagrammatic plan view on a variable air intake arrangement.

FIG. 2 is a plan view of a rearward part of a variable air intake,

FIGS. 6 and 7 are schematic perspective views showing the movement of the thermal shield member, and FIG. 8 is a perspective view of the intake shown in FIG. 1.

Figure 3:
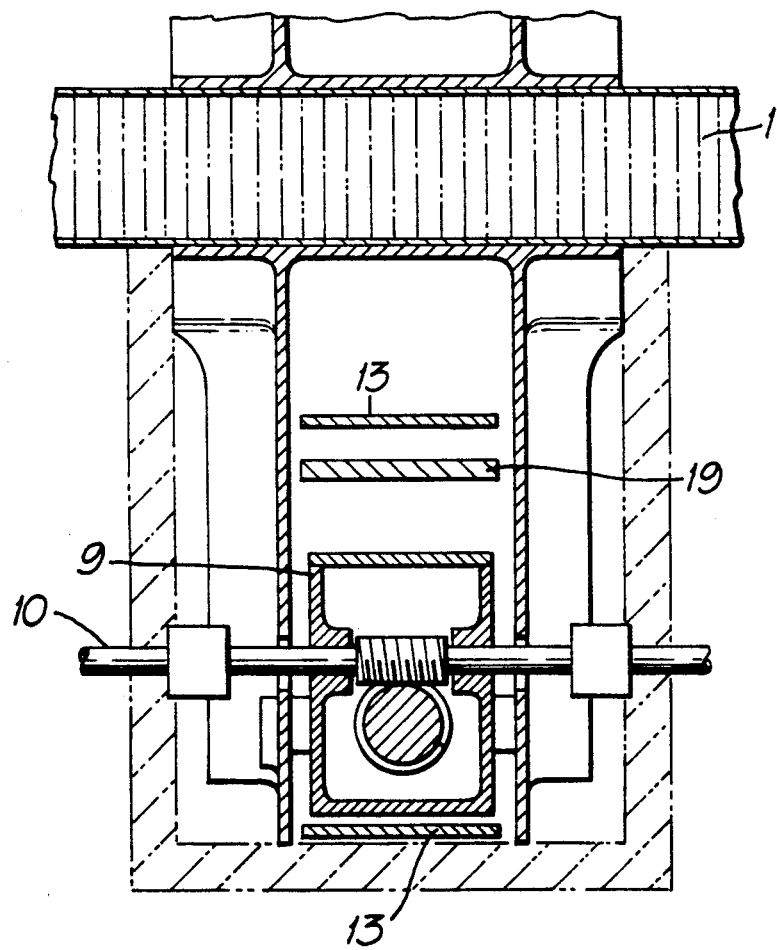
FIG. 3 is a section through A—A of FIG. 1.

The intake shown in FIGS. 1 and 2 are an identical dual intake arrangement disposed symmetrically about the longitudinal centre line 1, however only one side will be described in detail.

Referring to the drawings, FIG. 1 illustrates diagrammatically a plan view through one half of a dual air intake arrangement 20 incorporated into a flight vehicle (not shown) and includes an air intake opening 21 whose opening is defined by a fixed ramp 22 and an intake lip 23. The air intake control system includes a variable ramp arrangement comprising a series of interconnected ramp panels, the most rearward panel 2 having a pivotal attachment 4 to ramp actuating drive screw means 7 as hereinafter described. By this means the geometry of the air intake ramps may be varied to provide optimised air intake flow to match propulsion engine demand.

FIG. 2 shows the ramp 2 in its two extreme positions (2, 2'). The ramp 2 is pivotally fixed at its forward end 3 to a further intake defining ramp member (not shown), and is pivotally fixed at its rearward or aft end to a travelling fairing 5, which in turn is fixed to a carriage 6. The carriage 6 incorporates a trunnion engaging a drive screw 7, the drive screw 7 being supported for rotation by a bearing support 8 at one end and being in driving engagement with a gear box 9 at the other end. By means of an input drive shaft 10 to the gear box 9, the screw 7 is caused to rotate. It will be appreciated that rotation of the drive screw 7 causes the carriage 6 to move linearly between its extreme positions with consequent movement of the ramp 2.

Figure 4:
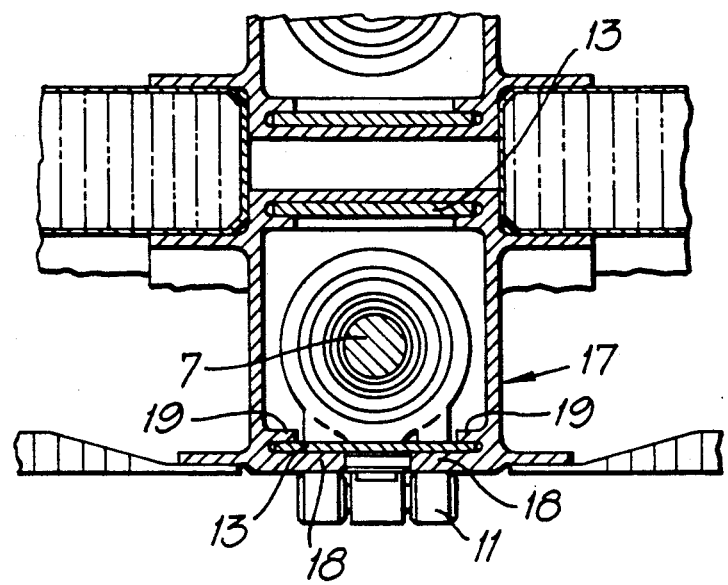
FIG. 4 is a section through B—B of FIG. 1.
Figure 5:
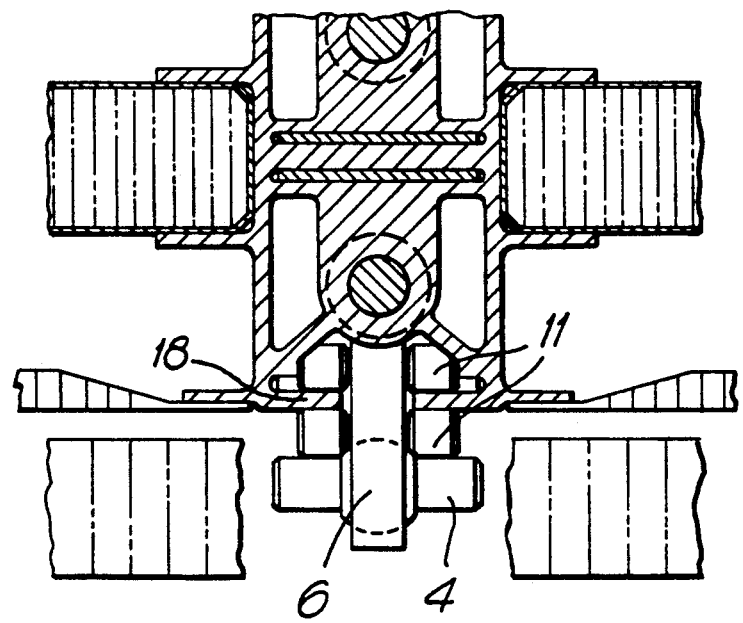
FIG. 5 is a section through C—C of FIG. 1.

The drive screw 7, gear box 9 and support bearing 8 are all housed within an integral structural unit 17 formed on the side of the longitudinal centre line 1. Included in this unit 17 is a track 12 defined by flange members 18 on which the carriage 6 is guided by means of rollers 11 (also shown in FIGS. 4 and 5).

In FIG. 2 the left-hand side of the drawing corresponds to upstream with respect to air drawn into the intake duct. It will be noted therefore that when the carriage and ramp are in the extreme upstream position (6', 2'), to produce a steep ramp angle, there is a portion of the drive screw 7 that would be exposed to potentially hot intake air due to frictional contact with surfaces of the intake flowing in the direction of the arrow in FIG. 2 over the ramp and fairing. The ramp, fairing and fixed structure of the intake may be made of non-metallic materials, for example ceramics, but the drive screw may need to be made of steel or titanium. In order to protect the drive screw 7 from damage caused by the impingement of hot air, a thermal protection blind 13 is provided connected to both ends of the carriage 6. The blind is guided from the upstream carriage end by pulleys 14 around the gearbox, and by a guide member 15, formed integrally with the structural unit 17, over the drive screw 7 and around the bearing support 8 to the downstream side of the carriage 5. In the region of the carriage, that is to say on the potentially exposed side of the drive screw 7, the blind is guided and supported by opposed flanges 19 defining a blind locating space with the track defining flange members 18. This guide means structure not only guides the blind, but also provides support for the blind to react against fluid pressure upon it. The blind 13 is tensioned by tensioning means 16 associated with one of the rollers 14 and including a tensioning member 19 fixed at one end to guide 15. The combination of the guide structure and the tensioning means ensures that the blind moves smoothly together with the carriage to which it is attached.

Operation of the ramp mechanism, and in particular the thermal blind, is best understood with reference to FIGS. 6 and 7. FIG. 6 shows the carriage 6 in its most downstream position with a shallow ramp angle. In this position there is no need to provide thermal protection for the drive screw since the ramp itself will shield the screw. However, as the carriage moves upstream (i.e., to the left in the Figures), to increase the ramp angle, the blind 13 downstream of the carriage is drawn to close off the space vacated as a result of ramp movement and provides an effective thermal barrier to the otherwise exposed drive screw, this region being illustrated by the shaded area in FIG. 7.

The blind 13 is, naturally, made of a heat resistant material, such as a ceramic material. It is not, however, necessary for the whole blind to be made of a heat resistant material; it may only be necessary for that portion forming the barrier to be of such material.

The ramp 2 may be driven by a dual actuation arrangement with two carriages driven on parallel drive screws. FIG. 8 illustrates such an arrangement and shows two exposed blind portions 13. A single fairing 5 may span both drive screws and extend the overall width of the ramp. FIG. 8 also illustrates that in addition to providing thermal protection for the drive screws, the blinds also serve to define a smooth surface for air flow into the aft spill duct and limiting the generation of turbulence.

The remainder of the blind not providing thermal protection may be used solely for blind tensioning, or in addition as a rudimentary pressure seal, should ducted cooling air or gas be considered necessary to augment the temperature control of each drive screw.

The thermal blind is preferably made of a ceramic based material, and is stiff in the vertical sense and flexible in plan form. The blind may, for example, comprise a number of hingedly connected sections.

I claim:

1. A variable geometry engine air intake for a supersonic aircraft comprising:
   a hollow intake body defining an intake passage therethrough to receive air into the engine, the air being of high temperature due to contact with said passage,
   drive means,
   a ramp member forming part of said intake body movable by said drive means to vary the geometry of said intake, and
   a thermal shield member movable with said ramp member to shield from the high temperature intake air a portion of the drive means that would otherwise be exposed by movement of said ramp member to such air.

2. A variable air intake according to claim 1 wherein said drive means includes a drive screw and a carriage mounted for linear movement on said drive screw, said ramp member being fixed at one end to said carriage and said thermal shield member comprises a thermal blind fixed to and movable with said carriage to shield said drive screw when the carriage is moved in one direction.

3. A variable air intake according to claim 2 wherein said thermal blind is fixed to both ends of said carriage and is guided therebetween by guide means.

4. A variable air intake according to claim 3 wherein said carriage and said drive screw are located within a structural housing, and said guide means are formed integrally with said housing.

5. A variable air intake according to claim 4 wherein said guide means includes means for supporting at least that portion of the said thermal blind that is subjected to an intake air flow.

6. A variable air intake according to any of claims 2 to 5 comprising thermal blind tensioning means.

7. A variable air intake according to claim 2 wherein said drive means includes a second drive screw parallel to the first mentioned drive screw and a second carriage, said carriages being mounted on said drive screws respectively, wherein said ramp member being driven by said carriages so mounted, and a fairing member extending the overall width of said ramp and spanning said carriages so as to bridge said carriages.

8. A variable air intake according to claim 1 wherein said thermal shield member comprises at least a portion of ceramic based material forming a thermal barrier to shield said portion of the drive means.

9. A variable geometry engine air intake for supersonic aircraft comprising:
   a hollow intake body defining an intake passage therethrough to receive air into the engine, the air being of high temperature due to contact with said passage,
   a drive screw, thermal blind and ramp member, and
   a carriage mounted for linear movement on said drive screw and said thermal blind,
   said ramp member forming part of said intake body, said ramp member being fixed at one end to said carriage and being movable thereby to vary the geometry of said air intake and said thermal blind being fixed to both ends of said carriage and movable therewith and being guided between said ends of said carriage by guide means to shield said drive screw when said carriage is moved in one direction exposing said drive screw to the high temperature intake air.

10. A variable air intake according to claim 9, further including a structural housing and wherein said carriage and said drive screw are located within said structural housing, said guide means being formed integrally with said housing.

11. A variable air intake according to claim 10 wherein said guide means includes means for supporting at least that portion of said thermal blind that is subjected to an intake air flow.

12. A variable air intake according to claim 11 comprising thermal blind tensioning means.

13. A variable air intake according to claim 12 including a second drive screw parallel to the first mentioned drive screw and a second carriage, said carriages being mounted on said drive screws, respectively, wherein said ramp member being driven by two said carriages so mounted, and a fairing member extending the overall width of said ramp and spanning said carriages so as to bridge said carriages.

14. A variable air intake according to claim 13 wherein said thermal blind is made at least in part of ceramic based material.

* * * * *